(12) United States Patent
Iwasa

(10) Patent No.: US 7,343,092 B2
(45) Date of Patent: Mar. 11, 2008

(54) ATTACHMENT STRUCTURE OF ADAPTER

(75) Inventor: Kazuyuki Iwasa, Hachioji (JP)

(73) Assignee: Olympus Corporation, Tokyo (JP)

( * ) Notice: Subject to any disclaimer, the term of this patent is extended or adjusted under 35 U.S.C. 154(b) by 422 days.

(21) Appl. No.: 11/153,579

(22) Filed: Jun. 15, 2005

(65) Prior Publication Data
US 2005/0281554 A1    Dec. 22, 2005

Related U.S. Application Data

(60) Provisional application No. 60/580,696, filed on Jun. 17, 2004.

(51) Int. Cl.
*G03B 7/26* (2006.01)
*G03B 17/02* (2006.01)
(52) U.S. Cl. ................... 396/301; 396/539
(58) Field of Classification Search ............. 396/25, 396/29, 301, 539; 348/372
See application file for complete search history.

(56) References Cited

U.S. PATENT DOCUMENTS 5,333,022 A * 7/1994 Katagiri et al. ............ 396/29
5,917,545 A * 6/1999 Kowno et al. ............ 348/231.9
6,118,949 A * 9/2000 Ohtani ...................... 396/277

FOREIGN PATENT DOCUMENTS

JP           57-58133           4/1982

* cited by examiner

Primary Examiner—Christopher Mahoney
(74) Attorney, Agent, or Firm—Straub and Pokotylo; John C. Pokotylo

(57) ABSTRACT

In the present invention, in a battery adapter to be engaged with a camera body, a tripod screw provided at an upper surface portion is engaged with a tripod screw of the camera body, and a positioning pin is fitted in a positioning hole provided in the camera body. Furthermore, a contact piece support including electrode contact portions is inserted into a battery chamber of the camera body in order to effect electrical connection with battery contact pieces provided in the battery chamber. A waterproofing seal for waterproofing the gap between the contact piece support and the battery chamber is provided around a lower portion of the contact piece support.

14 Claims, 8 Drawing Sheets

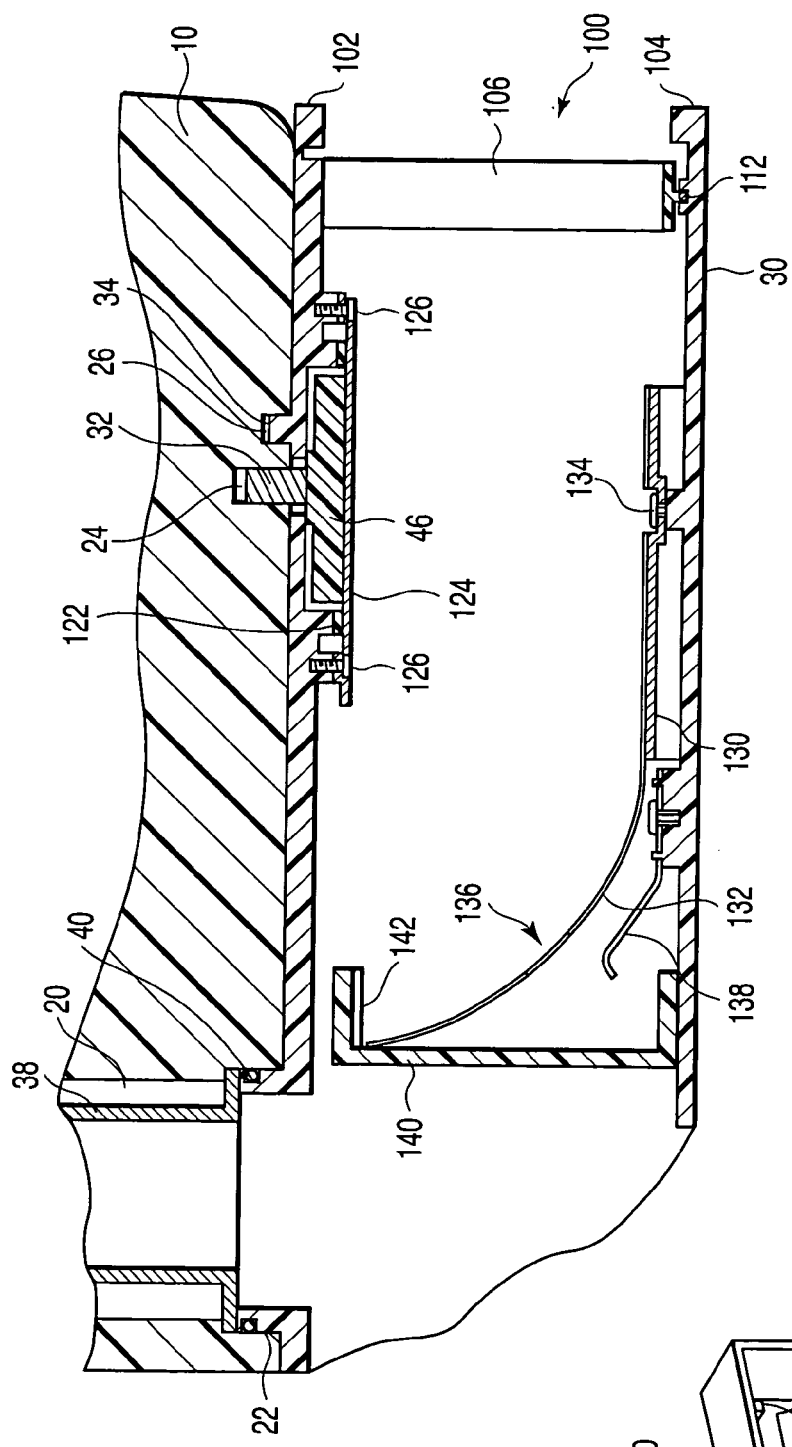
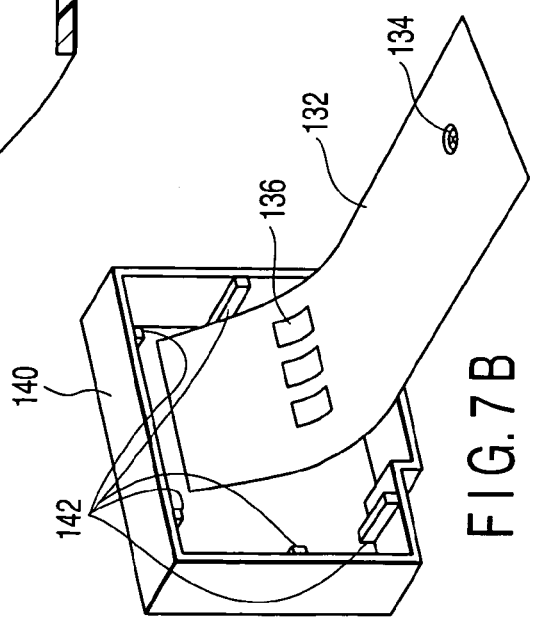
FIG. 7A
FIG. 7B

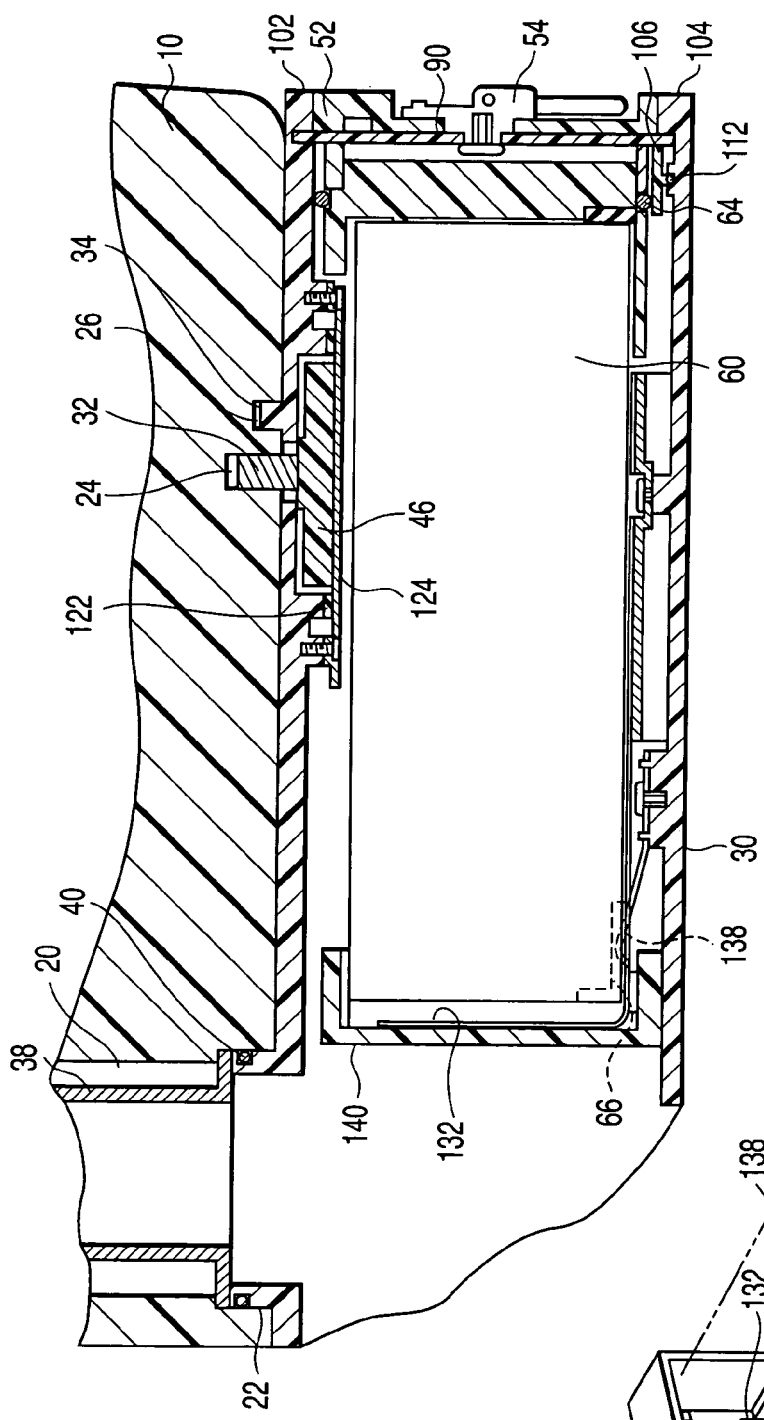
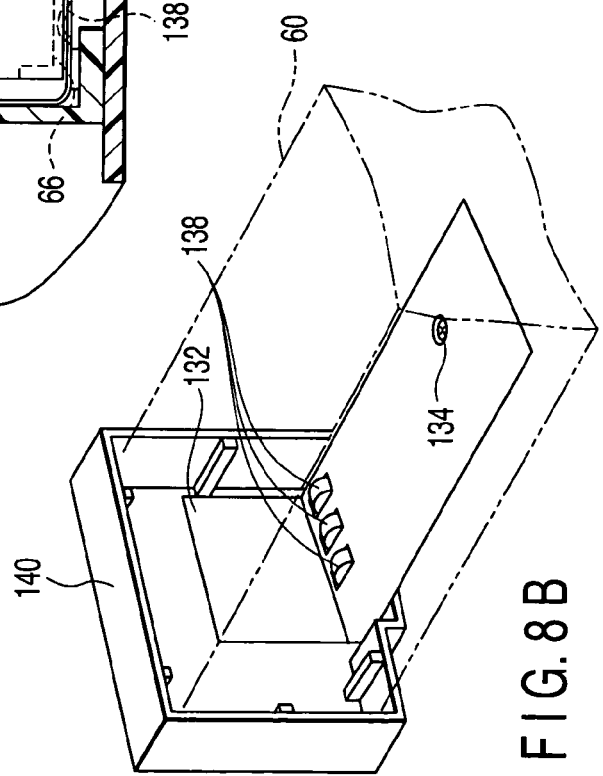
FIG. 8A
FIG. 8B

ATTACHMENT STRUCTURE OF ADAPTER

CROSS-REFERENCE TO RELATED APPLICATIONS

This application claims the benefit of U.S. Provisional Application No. 60/580,696, filed Jun. 17, 2004.

BACKGROUND OF THE INVENTION

1. Field of the Invention

The present invention relates to an attachment structure of an adapter which can be engaged with and detached from an electronic device such as a camera, more particularly, improvement of an attachment structure of an adapter including therein a battery for supplying power to an electronic device such as a camera.

2. Description of the Related Art

A camera which is in general use includes a battery chamber in its main body. A specific battery or a dry battery or the like is set into the battery chamber, and power is supplied to circuits in the camera, thereby performing various functions.

The size of such a battery chamber is limited. As a result, the capacity of the battery is determined, and the number of photographs which can be taken is thus limited. Therefore, in order to take a large number of photographs, it is necessary to carry a number of batteries, and carry out battery-exchange during photographing.

In recent years, in order to satisfy the above requirement, a battery adapter has been developed which can be engaged with and detached from the camera body, and includes a battery pack having a large capacity in the battery adapter. Such a battery adapter is engaged with the camera body by utilizing a screw hole for tripod which is provided in, e.g., a bottom portion of the camera body.

Jpn. Pat. Appln. KOKAI Publication No. 57-58133 discloses a technique in which a camera body and an electric driving device to be engaged with a bottom portion of the camera body are positioned by their relatively positioning pin and tripod screw.

In the attachment structures of the camera body and the device to be engaged with the camera body, disclosed in Jpn. Pat. Appln. KOKAI Publication No. 57-58133, the camera body and the electric driving device to be engaged with the bottom portion of the camera body are positioned by their relatively positioning pin and tripod screw as described above. Due to this positioning, contacts of the camera and those of the electric driving device are electrically connected to each other.

In the technique disclosed in Jpn. Pat. Appln. KOKAI Publication No. 57-58133, the camera body and the device to be engaged with the camera body are positioned in two positions only, i.e., the relatively positioning pin and tripod screw. Then, when positioning is effected, an electrical connection between the contacts of the camera and those of the electric driving device is achieved.

BRIEF SUMMARY OF THE INVENTION

In attachment structures of a camera body and an adapter to be engaged with the camera body, the present invention provides the attachment structure of the adapter which is featured in that it can be relatively positioned with reliability and without being influenced by an error in shapes of parts.

Furthermore, the present invention is featured in that in the attachment structures of the camera body and the adapter to be engaged therewith, the gap between a battery chamber of the camera body and the outside can be waterproofed.

As a feature of the present invention, the invention provides an external power supply device to be engageable with an electronic device, which comprises:

a main body which allows a battery serving as a power source to be set in the main body;

a contact support including contacts for supplying power from the battery to the electronic device, the contact support projecting from the main body, and being to be inserted into a battery chamber of the electronic device;

a waterproofing member annularly provided around the contact support to prevent water from entering the battery chamber, the waterproofing member being to be fitted in a concave portion which is provided in the vicinity of a periphery of an opening of the battery chamber, and in which a battery cover is to be set;

a fixing member to be located between the main body and the electronic device, for fixing the main body and the electronic device to each other; and a first relative position determining member to be provided between the main body and the electronic device, for determining relative positions of the main body and the electronic device, wherein the concave portion and the waterproofing member fitted in the concave portion function as a second relative position determining member for determining relative positions of the main body and the electronic device.

As another feature of the present invention, the invention provides an external power supply device to be engageable with an electronic device, which comprises:

a main body which allows a battery serving as a power source to be set in the main body;

a contact support which is to be inserted into a battery chamber of the electronic device, and comprises a pillar portion provided with contacts for supplying power from the battery to the electronic device, and a frustum which is provided between the pillar portion and the main body, the frustum being to be located a predetermined distance apart from an annular concave portion which is formed around an opening of the battery chamber, and in which a battery cover is to be set;

a waterproofing member annularly provided around the frustum to prevent water from entering the battery chamber, the waterproofing member being to be fitted in the annular concave portion which is formed around the opening of the battery chamber;

a fixing member to be located between the main body and the electronic device, for fixing the main body and the electronic device to each other; and a first relative position determining member to be located between the main body and the electronic device, for determining relative positions of the main body and the electronic device, wherein the concave portion and the waterproofing member fitted in the concave portion function as a second relative position determining member for determining relative positions of the main body and the electronic device.

As a further feature of the present invention, the invention provides a system which comprises an electronic device provided with a battery chamber for accommodating a battery, and an external power supply device for supplying power to the electronic device, wherein:

the electronic device includes an annularly shaped concave portion which is included in the electronic device, which is formed around an opening of a battery chamber of the electronic device, and in which a battery cover for closing the battery chamber is to be set; and the external power supply device includes (i) a main body which allows a battery serving as a power source to be set in the main body, (ii) a contact support which is to be inserted into a battery chamber of the electronic device, and which comprises a pillar portion including contacts for supplying power from the battery to the electronic device, and a frustum which is provided between the pillar portion and the main body, the frustum being to be located a predetermined distance apart from the annularly shaped concave portion which is formed around the opening of the battery chamber, and in which the battery cover is to be set, (iii) a waterproofing member annularly provided around the frustum to prevent water from entering the battery chamber, the waterproofing member being to be fitted in the annularly shaped concave portion which is formed around the opening of the battery chamber, and (iv) a fixing member to be located between the main body and the electronic device, for fixing the main body and the electronic device to each other, the system comprising:

a plurality of first relative position determining members to be located between the main body and the electronic device, for determining relative positions of the main body and the electronic device; and a plurality of second relative position determining members which comprise the concave portion and the waterproofing member, the concave portion and the waterproofing member being provided to determine relative positions of the main body and the electronic device, when the waterproofing member is fitted in the concave portion.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a perspective view showing appearance of the battery pack as viewed from a direction. FIG. 3B is a perspective view showing the battery pack as viewed from an opposite direction to the above direction in FIG. 3A.

FIG. 7A is a vertical section partially showing an example of a state where the battery adapter 30 is engaged with the camera body 10, with the battery pack body 60 removed from the battery adapter 30. FIG. 7B is a view for use in explaining a protection sheet and a battery positioning support in the state shown in FIG. 7A.

FIG. 8A is a vertical section partially showing an example of a state wherein the battery adapter 30 is engaged with the camera body 10, with the battery pack body 60 inserted in the battery adapter 30. FIG. 8B is a view for use in explaining the protection sheet and the battery positioning support in the state shown in FIG. 8A.

DETAILED DESCRIPTION OF THE INVENTION

An embodiment of the present invention will be explained with reference to the accompanying drawings.

Figure 1:
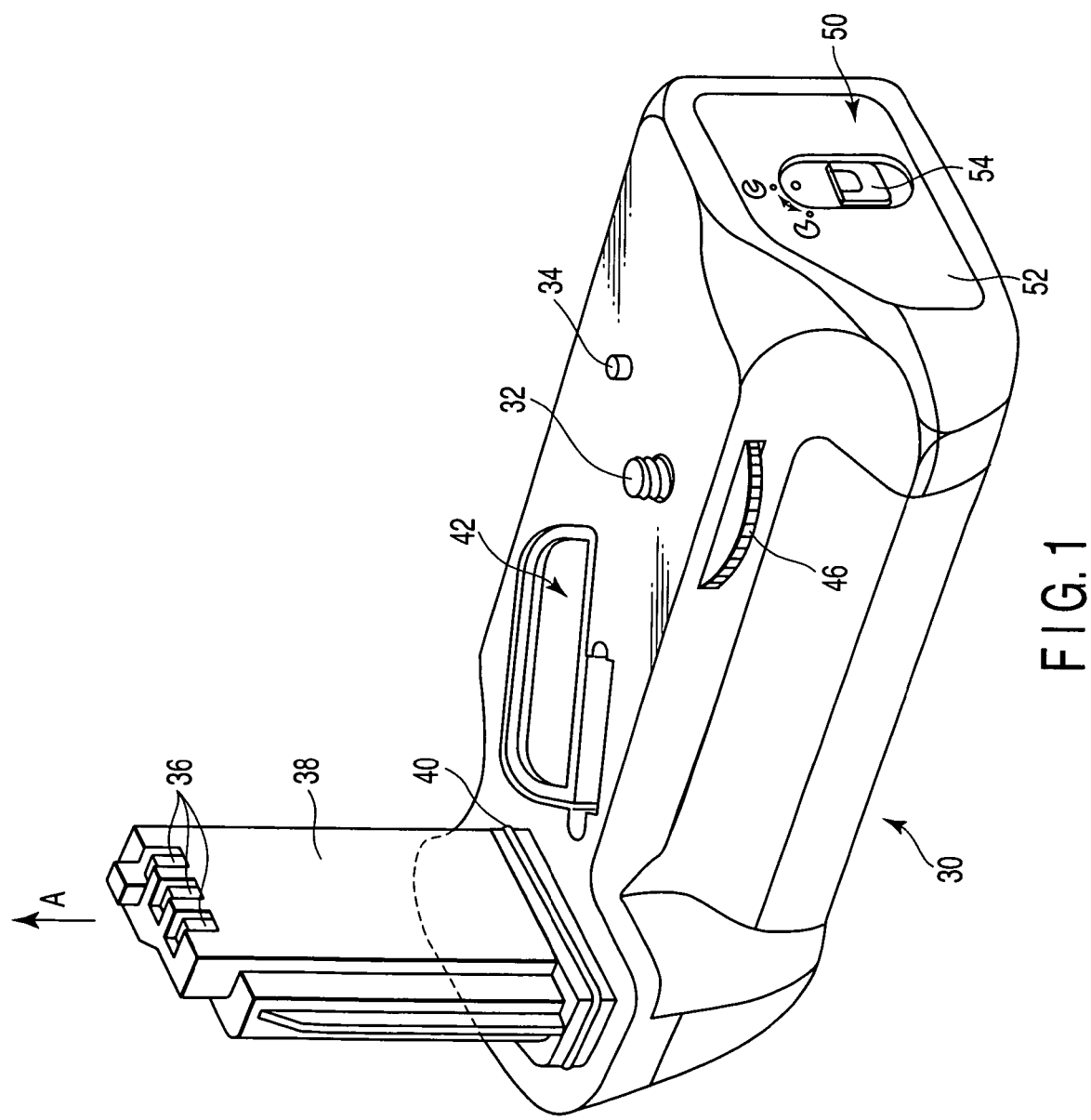
FIG. 1 is a perspective view showing appearance of the structure of a battery adapter of a camera which is an electronic device according to an embodiment of the present invention.
Figure 2:
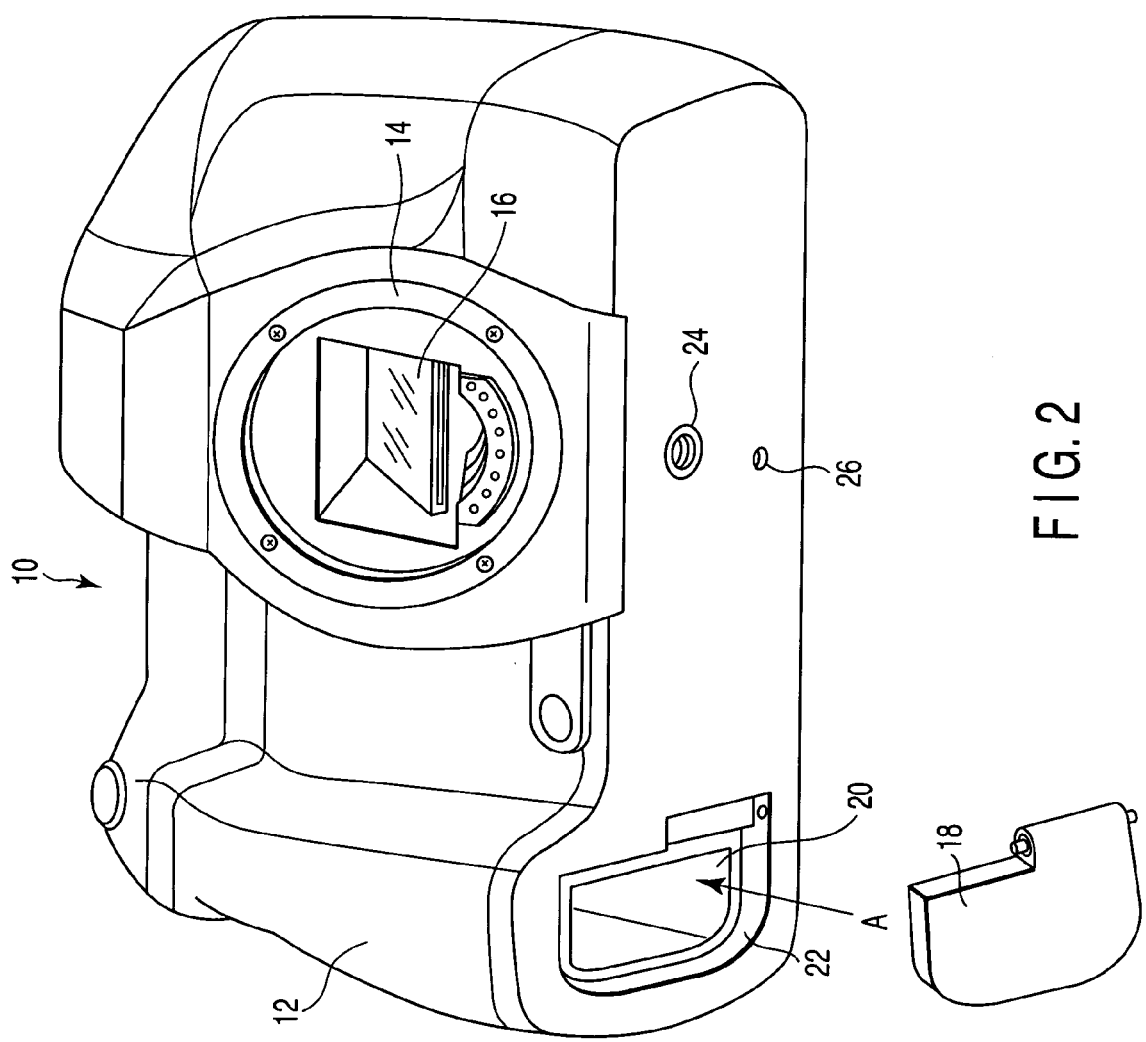
FIG. 2 is a perspective view showing appearance of the structure of a camera body into which the battery adapter in FIG. 1 is to be inserted.

FIG. 1 is a perspective view showing appearance of the structure of a battery adapter of a camera which is an electronic device according to an embodiment of the present invention. FIG. 2 is a perspective view showing appearance of the structure of a camera body into which the battery adapter in FIG. 1 is to be inserted.

In a system of the present invention, a camera body corresponds to the electronic device, and the battery adapter to be inserted into the camera body corresponds to an external power supply device. At a front portion of a camera body 10, a grip portion 12 is formed, and is to be gripped to hold the camera body 10. At a substantially center portion of the front portion of the camera body 10, a mount portion 14 with which a lens barrel not shown is to be engaged is provided. It should be noted that "16" denotes a main mirror for guiding incident light to a finder not shown.

At a bottom portion of the camera body 10, an openable battery cover 18 is provided under the grip portion 12. Also, a battery chamber 20 into which a battery as a power source of a camera is to be inserted is provided inward of the battery cover 18. It should be noted that FIG. 2 illustrates the structure of the camera body 10, with the battery cover 18 detached from the camera body 18, as a matter of convenience for explanation.

In the vicinity of a battery insertion opening of the battery chamber 20, an engagement wall 22 with which the battery cover 18 is to be engaged is provided in such a manner as to provide an opening which is larger than the battery insertion opening. In the bottom portion of the camera body 10, a tripod screw 24 and a positioning hole 24 are formed. The tripod screw 24 is a female screw which is used when a tripod not shown or the like is fixed to the camera body 10. The positioning hole 26 is used in positioning the tripod or the like.

A battery adapter 30 has a surface where a positioning pin 34 and a tripod screw 32 are formed in positions facing the positioning hole 26 and tripod screw 24, respectively, and which faces the bottom portion of the camera body 10. The tripod screw 32 is a male screw to be engaged with the tripod screw 24 of the camera body 10. Furthermore, in a position to face the battery cover 18, a contact piece support 38 is formed. The contact piece support 38 includes electrode contacts 36 to be brought into contact with electric contacts not shown which are provided in the camera body 10. A waterproofing seal (O-ring) 40 is provided close to a bottom portion of the contact piece support 38, and has a portion which is slightly larger in diameter than the contact piece support 38.

As shown in FIG. 2, the battery cover 18 of the camera body 10 is detached therefrom, and the contact piece support 38 is inserted into the battery chamber 20 in a direction indicted by an arrow A. Consequently, the waterproofing seal 40 is brought into contact with a peripheral wall which is the engagement wall 22 provided in the vicinity of the opening of the battery chamber 20. Thereby, the battery chamber 20 of the camera body 10 is waterproofed to prevent permeation by water from the outside. Furthermore, the positioning pin 34 is fitted in the positioning hole 26, and the tripod screw 34 is engaged with the tripod screw 24. As a result, the battery adapter 30 is positioned with respect to the camera body 10.

The cross section of the contact piece support 38 in the horizontal direction is similar to and slightly smaller than that of the battery chamber 20 of the camera body 10. The tripod screw 32 is provided in a hole which is formed in an upper surface portion of the battery adapter 30 in such a way as to provide an allowance between the tripod screw 32 and the hole.

In the upper surface portion of the battery adapter 30, a concave portion for holding the battery cover 18 of the camera body 10 is formed. The concave portion serves as a battery cover holding portion 42. In order that the contact piece support 38 be inserted into the battery chamber 20, the battery cover 18 is detached from the camera body 10. Thus, when the battery adapter 30 is used, the battery cover 18 is fitted in the battery cover holding portion 42 to prevent the battery cover 18 from being lost.

In a front portion of the battery adapter 30, a tripod screw dial 46 is provided, and used in engaging the tripod screw 32 with the tripod screw 24 of the camera body 10. When the tripod screw dial 46 is rotated in a predetermined direction, the engaged state of the tripod screw 32 and the tripod screw 24 is adjusted to engage the battery adapter 30 with the camera body 10 or detach the battery adapter 30 therefrom.

In a side portion of the battery adapter 30, a battery cover member 52 is provided, and used in inserting a battery pack 50 into the main body of the battery adapter 30, and removing the battery back 50 therefrom. The battery cover member 52 includes a lock operation member 54 for locking the battery pack 50 in the main body of the battery adapter 30, and releasing the battery pack 50 from locking.

The camera body 10 and the battery adapter 30 are formed of, e.g., a mold or plastic.

Figure 3A:
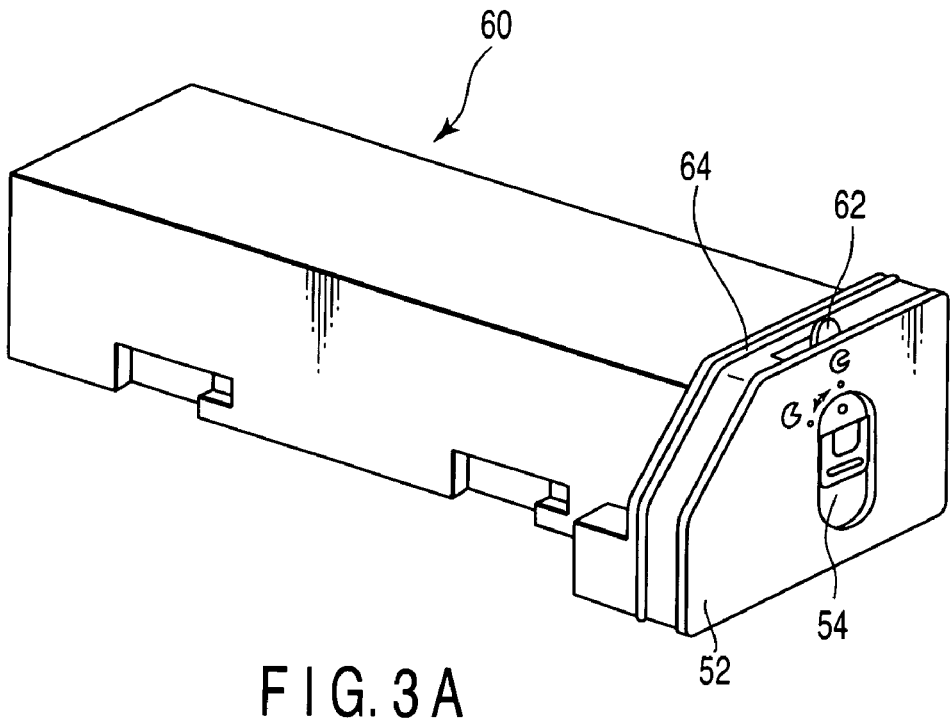
FIGS. 3A and 3B show the structure of a battery pack.
Figure 3B:
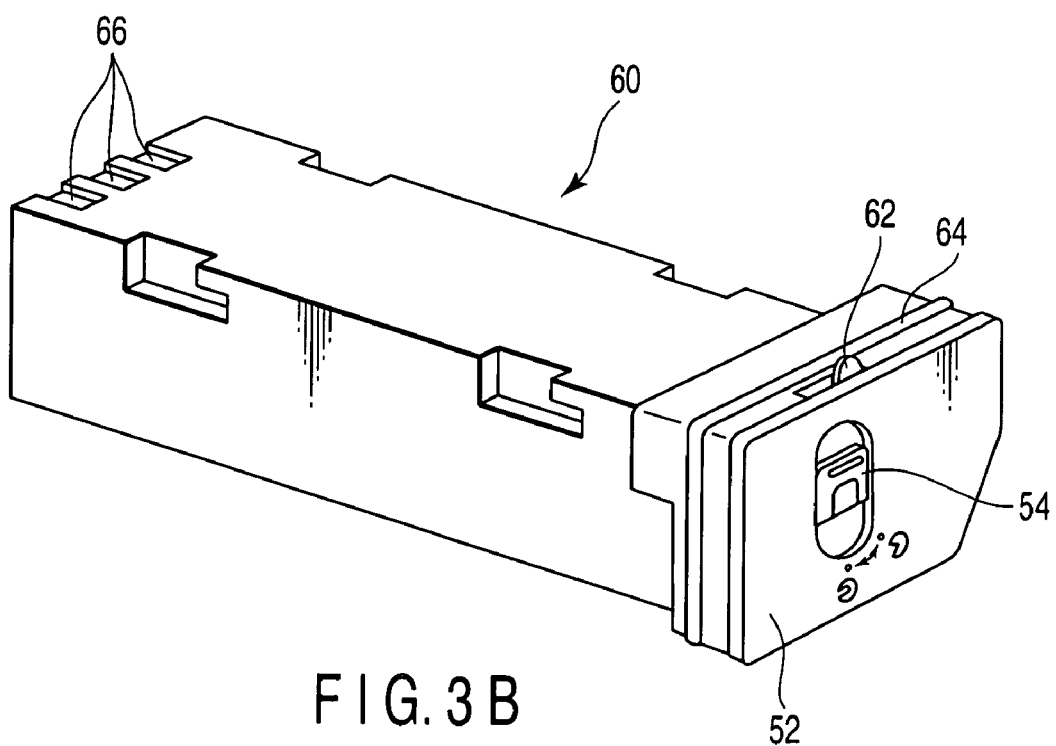

FIGS. 3A and 3B show the structure of the battery pack (replacement package). FIG. 3A is a perspective view showing appearance of the battery pack as viewed from a direction. FIG. 3B is a perspective view showing appearance of the battery pack as viewed from an opposite direction to the above direction (i.e., the reverse side of the battery pack).

The battery pack 50 has a structure wherein the battery pack body 60 is attached to the battery cover member 52.

The battery cover member 52 has a lock claw 62 for locking the battery pack body 60 in the battery adapter 30. The lock claw 62 is rotatable. When the lock claw 62 is rotated in a predetermined direction in interlock with the operation of the lock operation member 54, the battery cover member 52 is fixed to the battery adapter 30 or is released from fixation thereto. Around an outer periphery of the battery cover member 52, the waterproofing seal (O-ring) 64 is provided closer to battery electrodes (which will be described later) than the lock claw 62. The waterproofing seal 64 contacts a peripheral wall not shown of the battery adapter 30 to close the inside of the battery adapter 30 in a watertight manner. It is therefore provided as waterproofing means.

On a side of the battery pack body 60 which is opposite to the battery cover member 52, a number of battery electrodes 66 (the number of which is three in this case) are provided.

Figure 4:
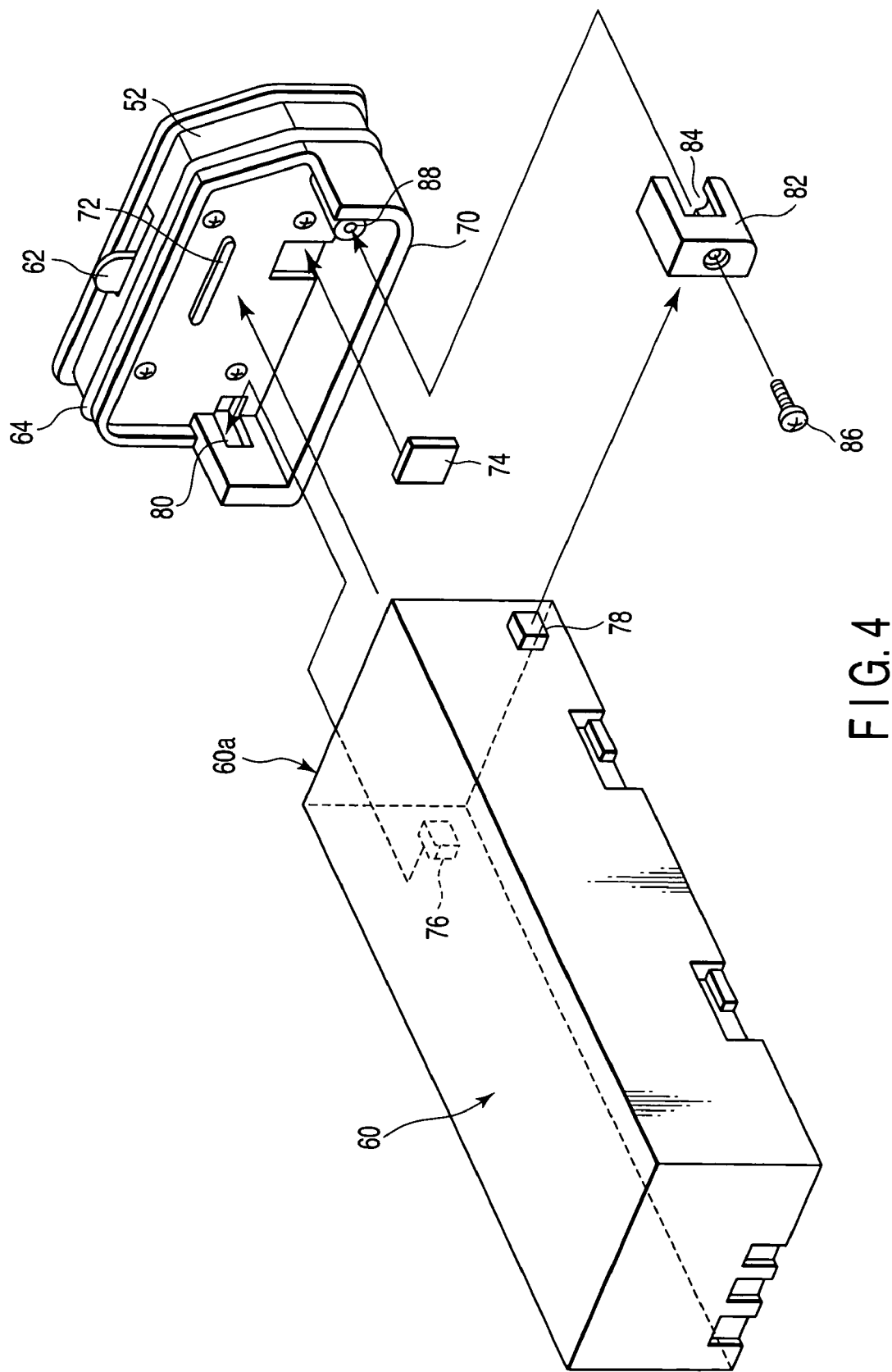
FIG. 4 shows a perspective exploded view showing the attachment structures of a battery cover member 52 and a battery pack body 60.

FIG. 4 shows a perspective exploded view showing the battery cover member 52 and the battery pack body 60.

The battery cover member 52, as described later, is fixed to an attachment 70 by a screw 86. The attachment member 70 includes a contact portion 72 to be brought into contact with a contact surface 60a of the battery pack body 60. Furthermore, a rubber cushion 74 serving as a buffer is bonded to the attachment member 70. Also, the attachment member 70 is brought into contact with the contact surface 60a of the battery back body 60, with the rubber cushion 74 interposed therebetween. Projections 76 and 78 each having, e.g., a substantially square vertical section are provided on side surfaces of the battery pack body 60 and close to the contact surface 60a. The projection 76 is fitted in formed in a notch 80 formed in the attachment member 70. The projection 78 is fitted in a notch 84 provided in a U-shaped fixing member 82. The fixing member 82 is fixed to an attachment portion 88 of the attachment member 70 by the screw 86.

Thereby, the contact surface 60a of the battery pack body 60 is brought into contact with the contact portion 72 and the rubber cushion 74. In addition, the projections 76 and 78 of the battery pack body 60 are held by the notch 80 and the notch 84 of the fixing member 82. To be more specific, the battery pack body 60 is shaken by an elastic force of the rubber cushion 74 contacting the battery pack body 60, with a surface of the contact portion 72 serving as a fulcrum, while the projections 76 and 78 are held by the notches 88 and 84.

Thus, when the projection 76 is fitted in the notch 80 such that space is provided between the projection 76 and the notch 80 in all the directions, the projection 78 is fitted in the notch 84 such that space is provided between the projection 78 and the notch 84 in all the directions, and the fixing member 82 is fixed by the screw 86, the battery pack body 60 is moved toward the attachment member 70 in the longitudinal direction of the battery pack body 60, and the contact surface 60a is brought into contact with the contact portion 72 and the rubber cushion 74.

In such a manner, the battery pack body 60 and the battery cover member 52 constitute a shaking mechanism or a relative movement mechanism which is movement means to be relatively moved by the elastic force of the rubber cushion 74.

Furthermore, between the battery cover member 52 and the attachment member 70, the waterproofing seal 64 is located closer to the battery pack body 60 than the lock claw 62. Thereby, even if water reaches the lock claw 62, it is prevented from entering the battery pack body 60.

Figure 5:
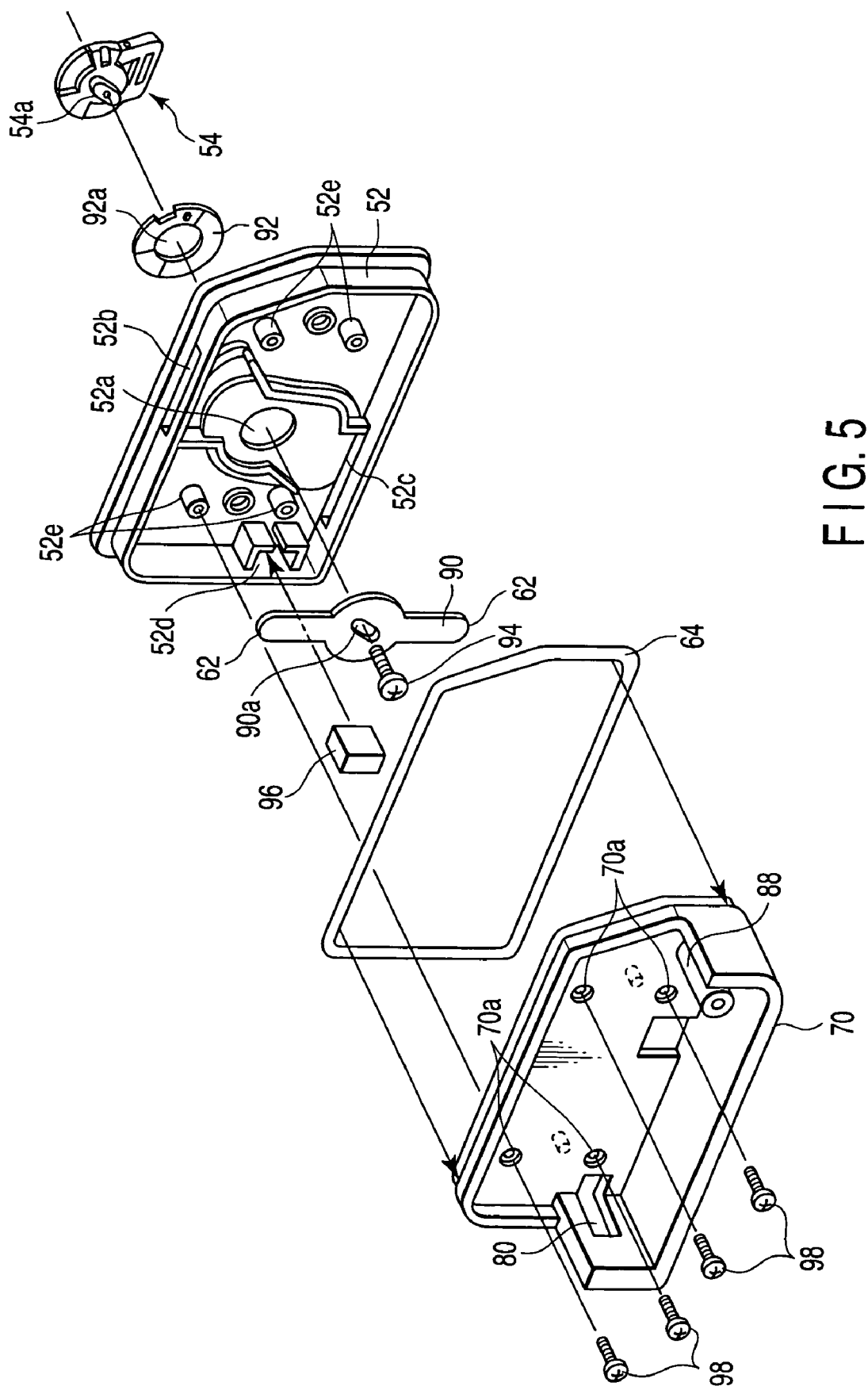
FIG. 5 is a perspective exploded view showing the structures of the above battery cover member 52 and the attachment member 70.

FIG. 5 is a perspective exploded view showing the structures of the above battery cover member 52 and the attachment member 70.

In a substantially center portion of the battery cover member 52, an opening 52a is formed. A fitting portion 54a of the lock operation member 54 is fitted in an elongated hole 90a formed in the center of a lock plate 90 having two lock claws 62, 62 through an opening 92a of a click spring 92, and they are screwed on each other by a screw 94. Thereby, the lock plate 90 is rotatable along with the lock operation member 54.

In the outer periphery of the battery cover member 52, slits 52b and 52c are formed. The lock claws 62, 62 of the lock plate 90 are inserted into the slits 52b and 52c. Thus, when the lock operation member 54 is operated to rotate the lock plate 90 in a predetermined direction, the lock claws 62, 62 are exposed from the slits 52b, 52c to the outside, and the battery cover member 52 is locked on the battery adapter 30. On the other hand, when the lock plate 90 is rotated in the opposite direction to the above direction, the lock claws 62b and 62c are not exposed from the slits 52b, 52c, and the battery cover member 52 is released from locking.

A sealing member 96 for waterproofing is attached to a position corresponding to the notch (hole) 80 of the attachment member 70. Furthermore, attachment portions 52a are provided on the battery cover member 52, and are screwed by screws 98 through screw holes 70a formed in the attachment member 70 in such a manner as to sandwich the waterproofing seal 64 serving as the O-ring. Thereby, the battery cover member 52 and the attachment member 70 are fixed to each other.

Figure 6:
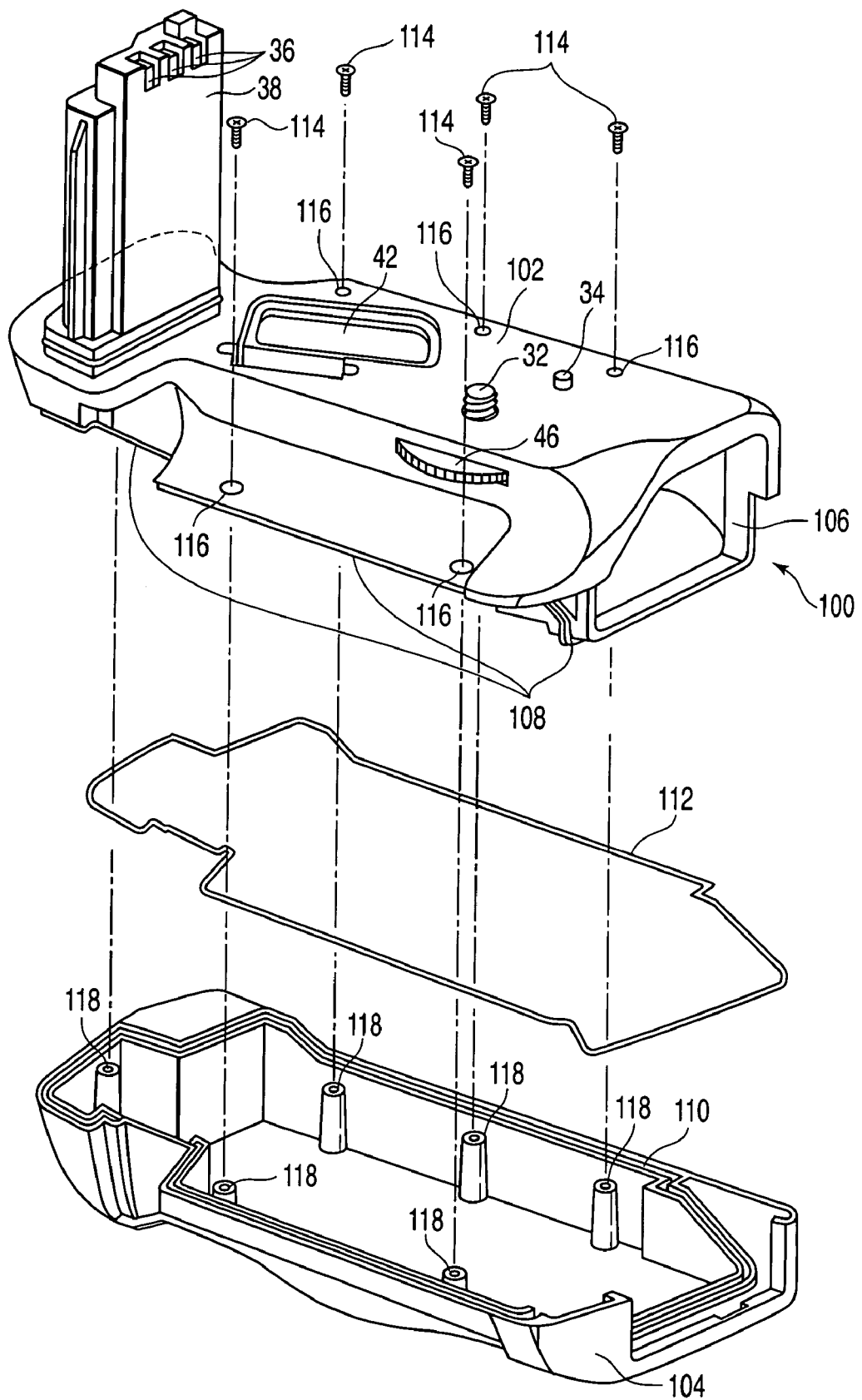
FIG. 6 is a perspective exploded view showing the structure of the battery adapter 30, with the battery cover member 52 detached therefrom.

FIG. 6 is a perspective exploded view showing the structure of the battery adapter 30, with the battery cover member 52 detached therefrom.

As shown in FIG. 6, the battery adapter 30 comprises an upper cover 102 serving as a first armored member including a frame 106, a lower cover 104 serving as a second armored member and a waterproofing seal (sealing member) 112 which is located between the upper cover 102 and the lower cover 104, for achieving watertight closing.

In the battery adapter 30, the frame (loop formation portion) 106 is formed integral with the upper cover 102 on a side to which the battery cover member 52 is to be attached. The upper cover 102 and the lower cover 104 define an opening 100, and the space between these covers is closed in a watertight manner by the waterproofing seal, and space between these covers is closed in a watertight manner by the waterproofing seal. The frame 106 formed integral with the upper cover 102 is prepared in order to reliably waterproof the opening 100.

To be more specific, the opening 100 defined by the frame 106, as stated above, is closed in a watertight manner by the waterproof 64 provided around the battery cover member 52, independent of water-proofing of the upper and lower covers. The frame (loop formation portion) 106 and the waterproofing seal 64 constitute first waterproofing means.

It should be noted that, needless to say, the frame may be formed at the lower cover 104, not the upper cover 102, as long as it is formed integral with the lower cover 104.

Referring to FIG. 6, in a position of an outer peripheral portion of the upper cover 102, which faces the lower cover 104, a convex projection 108 for sealing is continuously formed over a round area of the peripheral portion. Similarly, in a position of an outer peripheral portion of the lower cover 104, which faces the upper cover 102, a concave sealing groove 110 is continuously formed over a round area of the peripheral portion of the lower cover 104. The waterproofing seal 112 is embedded along the sealing groove 110. The projection 108 for sealing, the sealing groove 110 and the waterproofing seal 112 constitute second waterproofing means.

The projection 108 for sealing may be formed at the lower cover 104, and the sealing groove 110 may be formed at the upper cover 102.

FIG. 6 shows that the waterproofing seal 112 is ring-shaped. However, it may be formed linearly.

The upper cover 102 is attached to the lower cover 104, with the waterproofing seal 112 embedded in the sealing groove 110 of the lower cover 104. This attachment is carried out by screwing screws 114 into attachment portions 118 of the lower cover 104 through screw holes 116 formed in the upper cover 102. At this time, the projection 108 for sealing is brought into tight contact with the waterproofing seal 112, as a result of which the upper cover 102 and the lower cover 104 are closed in a watertight manner from the outside, except the opening 100.

FIG. 7A is a vertical section partially showing an example of a state where the battery adapter is engaged with the camera body, with the battery pack body 60 removed from the battery adapter. FIG. 7B is a view for use in explaining a protection sheet and a battery positioning support in the state shown in FIG. 7A. FIG. 8A is a vertical section partially showing an example of a state wherein the battery adapter is engaged with the camera body, with the battery pack body 60 inserted in the battery adapter. FIG. 8B is a view for use in explaining the protection sheet and the battery positioning support in the state shown in FIG. 8A.

The contact piece support 38 is inserted into the battery chamber 20 of the camera body 10, and the waterproofing seal 40 is brought into contact with the wall 22 at an opening portion of the battery chamber 20.

Furthermore, the positioning pin 34 is fitted in the positioning hole 26, and the tripod screw 32 is engaged with the tripod screw 24. As a result, the battery adapter 30 is accurately engaged with the camera body 10.

In the upper cover 102, the tripod screw dial 46 is tightly covered by a tripod-screw stop plate 124 formed of, e.g., metal. The tripod-screw stop plate 124 is screwed on the upper cover 102 by screws 126, with a waterproofing seal 122 interposed between the tripod-screw stop plate 124 and the upper cover 102.

In a position of the frame 106 which faces the lower cover 104, a waterproofing seal 112 is provided.

In a predetermined position of the lower cover 104, a protection-sheet stop plate 130 for fixing a protection sheet 132, which is flexible and will be described later, is provided. The protection sheet 132 is fixed to the lower cover 104 by a screw 134, with the protection-sheet stop plate 130 interposed between the protection sheet 132 and the lower cover 104.

In the protection sheet 132, a number of holes (openings) 136 for battery contact pieces are formed in predetermined positions (three positions). The holes 136 are formed in positions corresponding to battery contact pieces 138 provided in predetermined positions of the lower cover 104.

The battery contact pieces 138, as shown in FIGS. 8A and 8B, are located in positions where they can electrically contact the battery electrodes 66, with the battery pack body 60 inserted in the battery adapter 30.

The battery positioning support 140 is provided to position the battery pack body 60 in a predetermined position in the battery adapter 30. In the battery positioning support 140, guide portions (rib-shaped projections) 142 for guiding the battery pack body 60 are formed.

The battery pack body 60, as explained above, is shakably held by the battery cover member 52. Therefore, the position of another end side of the battery pack body 60, on which the battery electrodes 66 are provided, is not fixed. Thus, the battery positioning support 140 is provided to accurately position the battery pack body 60.

The protection sheet 132 is intended to prevent occurrence of the following problem: a metal piece such as a clip enters the battery adapter 30, when the battery pack body 60 is not located in the battery adapter 30, as a result of which when the battery pack body 60 is inserted thereinto, the battery contact pieces 138 is short-circuited to the battery electrodes 66 by the clip or the like. Accordingly, the protection sheet 132 can prevent a short-circuit in the battery which would occur due to a metal piece therein.

To be more specific, one side of the protection sheet 132 is fixed by the screw 134. When the battery pack body 60 is not set in the battery adapter 30, the other side of the protection sheet 132 is bent such that its end portion contacts the battery positioning support 140, as shown in FIGS. 7A and 7B. In this state, the battery contact pieces 138 are not moved into the holes 136 provided in the protection sheet 132, and cannot be observed from the outside. Therefore, in the above state, the protection sheet 132 prevents the battery contact pieces from being short-circuited, even if a metal piece enters the battery adapter 30.

Then, if the battery pack body 60 is inserted into the battery pack 30, with a metal piece located therein, the metal piece is caught by the protection sheet 132. Thus, the battery pack body 60 cannot be held by the battery positioning support 140, and the battery cover member 52 cannot be closed. Therefore, it can be found that an abnormality occurs in the battery adapter 30, and the battery pack body 60 can be prevented from being short-circuited.

Furthermore, when the battery pack body 60 is inserted in the battery adapter 30, as shown in FIGS. 8A and 8B, the protection sheet 132 is bent at a substantially right angle along a wall surface of the battery pack body 60 by the battery pack body 60. At this time, the battery contact pieces 138 are exposed from the holes 136. Consequently, the battery contact pieces are electrically connected to the battery electrodes 66.

With respect to the above embodiment, the battery adapter to be engaged with the camera body is explained by way of example. However, the invention is not limited to the battery adapter. It can be applied to any device, as long as the device has a waterproofing function, and allows a replacement battery to be inserted into the device and removed therefrom.

Moreover, needless to say, various modifications may be put to practical use without departing from the subject matter of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An external power supply device to be engageable with an electronic device, comprising:
    a main body which allows a battery serving as a power source to be set in the main body;
    a contact support including contacts for supplying power from the battery to the electronic device, the contact support projecting from the main body, and being to be inserted into a battery chamber of the electronic device;
    a waterproofing member annularly provided around the contact support to prevent water from entering the battery chamber, the waterproofing member being to be fitted in a concave portion which is provided in the vicinity of a periphery of an opening of the battery chamber, and in which a battery cover is to be set;
    a fixing member to be located between the main body and the electronic device, for fixing the main body and the electronic device to each other; and
    a first relative position determining member to be provided between the main body and the electronic device, for determining relative positions of the main body and the electronic device,
    wherein the concave portion and the waterproofing member fitted in the concave portion function as a second relative position determining member for determining relative positions of the main body and the electronic device.

2. The external power supply device according to claim 1, wherein the waterproofing member is an O-ring.

3. The external power supply device according to claim 1, wherein the fixing member comprises a male screw, and the male screw is rotatably provided at the main body, and is engageable with a female screw provided in the electronic device.

4. The external power supply device according to claim 1, wherein the male screw is a tripod screw.

5. The external power supply device according to claim 1, wherein the first relative position determining member comprises a projection provided at the main body.

6. An external power supply device to be engageable with an electronic device, comprising:
    a main body which allows a battery serving as a power source to be set in the main body;
    a contact support which is to be inserted into a battery chamber of the electronic device, and comprises a pillar portion provided with contacts for supplying power from the battery to the electronic device, and a frustum which is provided between the pillar portion and the main body, the frustum being to be located a predetermined distance apart from an annular concave portion which is formed around an opening of the battery chamber, and in which a battery cover is to be set;
    a waterproofing member annularly provided around the frustum to prevent water from entering the battery chamber, the waterproofing member being to be fitted in the annular concave portion which is formed around the opening of the battery chamber;
    a fixing member to be located between the main body and the electronic device, for fixing the main body and the electronic device to each other; and
    a first relative position determining member to be located between the main body and the electronic device, for determining relative positions of the main body and the electronic device,
    wherein the concave portion and the waterproofing member fitted in the concave portion function as a second relative position determining member for determining relative positions of the main body and the electronic device.

7. The external power supply device according to claim 6, wherein the waterproofing member is an O-ring.

8. The external power supply device according to claim 6, wherein the fixing member comprises a male screw, and the male screw is rotatably provided at the main body, and is engageable with a female screw provided in the electronic device.

9. The external power supply device according to claim 8, wherein the male screw is a tripod screw.

10. The external power supply device according to claim 6, wherein the first relative position determining member comprises a projection provided at the main body.

11. A system which comprises an electronic device provided with a battery chamber for accommodating a battery, and an external power supply device for supplying power to the electronic device, wherein:
the electronic device includes an annularly shaped concave portion which is included in the electronic device, which is formed around an opening of a battery chamber of the electronic device, and in which a battery cover for closing the battery chamber is to be set; and
the external power supply device includes (i) a main body which allows a battery serving as a power source to be set in the main body, (ii) a contact support which is to be inserted into a battery chamber of the electronic device, and which comprises a pillar portion including contacts for supplying power from the battery to the electronic device, and a frustum which is provided between the pillar portion and the main body, the frustum being to be located a predetermined distance apart from the annularly shaped concave portion which is formed around the opening of the battery chamber, and in which the battery cover is to be set, (iii) a waterproofing member annularly provided around the frustum to prevent water from entering the battery chamber, the waterproofing member being to be fitted in the annularly shaped concave portion which is formed around the opening of the battery chamber, and (iv) a fixing member to be located between the main body and the electronic device, for fixing the main body and the electronic device to each other,
the system comprising:
a plurality of first relative position determining members to be located between the main body and the electronic device, for determining relative positions of the main body and the electronic device; and
a plurality of second relative position determining members which comprise the concave portion and the waterproofing member, the concave portion and the waterproofing member being provided to determine relative positions of the main body and the electronic device, when the waterproofing member is fitted in the concave portion.

12. The system according to claim 11, wherein the waterproofing member is an O-ring.

13. The system according to claim 11, wherein the electronic device includes a tripod female screw, and the fixing member comprises a male screw, and the male screw is rotatably provided at the main body, and is engageable with the female screw of the electronic device, to thereby relatively fix the electronic device and the external power supply device to each other.

14. The system according to claim 11, wherein the first relative position determining members comprise a projection provided at the main body and a hole provided in the electronic device, and the projection is fitted in the hole, thereby determining the relative positions of the main body and the electronic device.

* * * * *